United States Patent [19]
Hoffmann et al.

[11] 3,924,711
[45] Dec. 9, 1975

[54] PARTIAL LINING DISK BRAKE

[75] Inventors: Friedrich Hoffmann; Wilhelm von Kamp, both of Stuttgart, Germany

[73] Assignee: Daimler-Benz Aktiengesellschaft, Germany

[22] Filed: Mar. 29, 1974

[21] Appl. No.: 456,294

[30] Foreign Application Priority Data
Sept. 6, 1973  Germany.............................. 2344902

[52] U.S. Cl. ............................................... 188/73.3
[51] Int. Cl.[2] ......................................... F16D 65/02
[58] Field of Search ....... 188/72.4, 72.5, 72.6, 73.3, 188/73.4, 73.5

[56] References Cited
UNITED STATES PATENTS

| | | | |
|---|---|---|---|
| 3,261,429 | 7/1966 | Burnett et al...................... | 188/72.5 |
| 3,612,227 | 10/1971 | Schaftner et al................... | 188/73.3 |
| 3,613,836 | 10/1971 | Dowell............................ | 188/73.3 X |
| 3,625,314 | 12/1971 | Rinker............................ | 188/73.3 X |

*Primary Examiner*—George E. A. Halvosa
*Attorney, Agent, or Firm*—Craig & Antonelli

[57] ABSTRACT

A partial lining disk brake, preferably with a floating saddle whose brake cushions are adapted to be supported at the inlet and/or outlet side by mutually opposite projections which are axially displaceably guided in recesses relative to the brake body by at least one nose preferably arranged in the center between the supports; the nose thereby engages with a counter support surface thereof in a notch matched thereto while the base surface of the notch is supported on the radially outer-surface of the nose.

8 Claims, 3 Drawing Figures

PARTIAL LINING DISK BRAKE

The present invention relates to a partial lining disk brake preferably with a floating saddle, whose brake cushions are adapted to be supported at the inlet or outlet side, especially by mutually symmetrical projections disposed opposite one another mirror-image-like, which are axially displaceably guided in recesses relative to the brake body and by way of at least one nose preferably arranged in the center between the supports, which nose engages with a countersupport surface into a matching notch or indentation.

The aforementioned patent application was concerned with avoiding the inclined positioning and therewith the inclined or oblique wear of the brake linings. This task has been essentially solved by the invention according to the aforementioned patent application. Nevertheless, under certain circumstances, a residual torque may still occur which seeks to incline the brake lining and possibly also the saddle or caliper. It is now the aim of the present invention to avoid the aforementioned disadvantages and to suppress additionally also the residual torque so that an oblique wear of the brake linings and an inclined positioning of the saddle are avoided.

The underlying problems are solved according to the present invention in that the base surface of the notch or groove is supported on the radially outer surface of the nose.

In order that also the saddle cannot be caused to assume an inclined position, it may be provided in a similar manner as the brake cushions or pads, with projections or recesses and notches which are guided in the associated guide rail parts of the brake body.

Additionally, the following may contribute to the jam-free and precise guidance of the floating saddle if, according to a further feature of the present invention, the guide rails (noses, recesses or notches) are constructed relatively long, preferably with a width-to-length ratio of about 1 : 10.

In one partial lining disk brake constructed according to the present invention, moments acting during the operation on the lining and also on the floating saddle far-reachingly cancel one another so that an oblique wear of the lining and a canting of the floating saddle can no longer occur. As a result of the center guidance of the brake linings and of the brake saddle constructed in the described manner, it is no longer necessary to undertake the previously customary unilateral milling-out of the piston front face. Accordingly, in a partial lining disk brake constructed according to the present invention, the piston front face presses with its entire circular surface flush against the brake cushion or pad so that no canting forces occur between the piston and the cylinder wall which heretofore have always adversely affected the fine-feeling metering ability of the brake and the length of life of the floating saddle.

Accordingly, it is an object of the present invention to provide a partial lining disk brake which avoids by simple means the aforementioned drawbacks and shortcomings encountered in the prior art.

Another object of the present invention resides in a partial lining disk brake in which any residual torques are reliably eliminated, thereby eliminating any uneven wear of the brake lining and also any tendency to position the floating saddle angularly.

A further object of the present invention resides in a partial lining disk brake in which the floating saddle is guided in an accurate manner, free of wedging or jamming, thereby increasing the reliability of operation of the brake.

Still another object of the present invention resides in a partial lining disk brake which excels by a fine feel as regards the application of the brake force, combined with a long length of life of the structural parts thereof.

These and other objects, features and advantages of the present invention will become more apparent from the following description when taken in connection with the accompanying drawing which shows, for purposes of illustration only, one embodiment in accordance with the present invention, and wherein.

Figure 1:
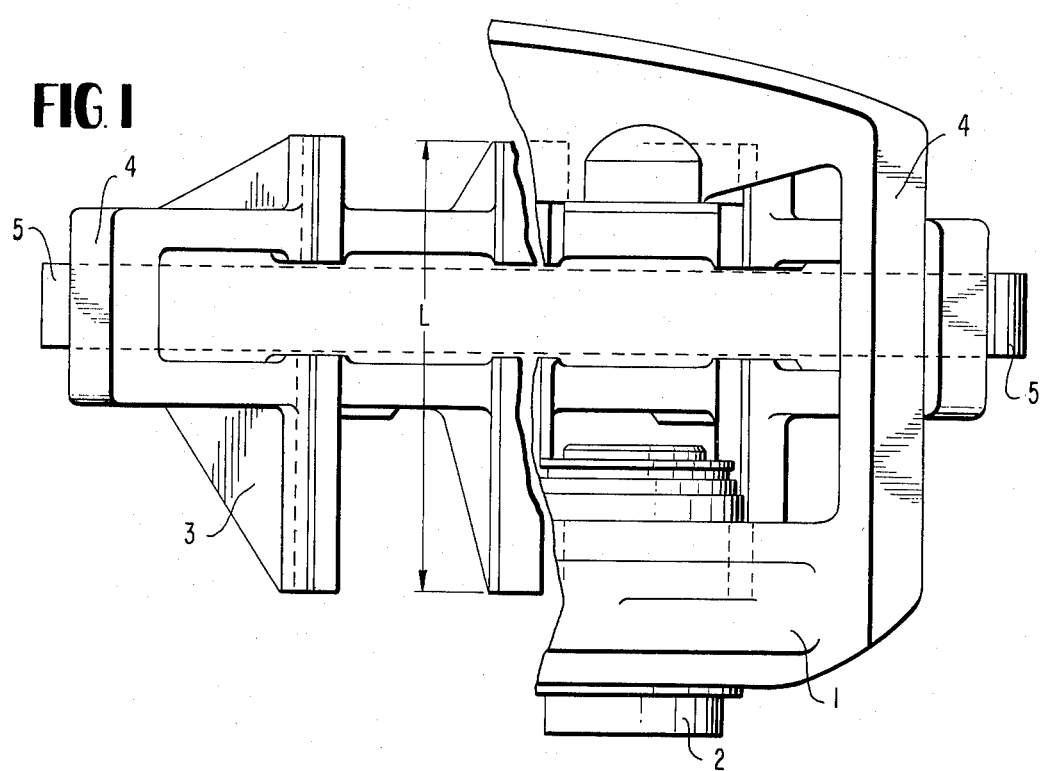
FIG. 1 is a plan view, partly broken away, of parts of the floating saddle, of the brake body and of the brake disk, illustrating how these parts cooperate according to the present invention.

Referring now to the drawing where in like numerals are used throughout the various views to designate like parts, in the floating saddle brake illustrated in the drawing, the floating saddle 1 which receives in a cylinder housing the pistons 2, rests on the brake body 3 and is thus carried and guided by the brake body. The brake body 3 overlaps in its turn with its saddle leg portions 4 the brake disk 5 and as to the rest is secured at the vehicle with the aid of the bolt bores 6 and bolts. The brake cushions or pads 9 consisting of the brake carrier 7 and of the brake lining 8 are provided on the inlet and on the outlet side with projections 11 which engage in recesses 12 of the brake body 3 which are matched to these projections 11. The projections 11 and recesses 12 which fit one into the other with clearance or play, therefore form rails in which the brake cushions 9 and the floating saddle 1, constructed in a similar manner, are guided axially displaceably with respect to the brake body 3.

The brake body 3 is provided with a nose portion 14 which is constructed symmetrically to a center plane 15 and which projects into a groove or notch 16 provided in the floating saddle 1 and in the brake cushions 9. The notches 16 and the nose portion 14 are so constructed that the base surface 31 (FIG. 2) of the notch 16 is supported on the radially outer roof surface of the nose 14.

The guide rails constituted by the projections 11, the recesses 12, the nose 14 and the notches 16 are relatively long. The ratio of width B of the nose 14 relative to the length L of the nose 14 is about 1 : 10. It is additionally assured thereby that the floating saddle cannot cant.

Figure 2:
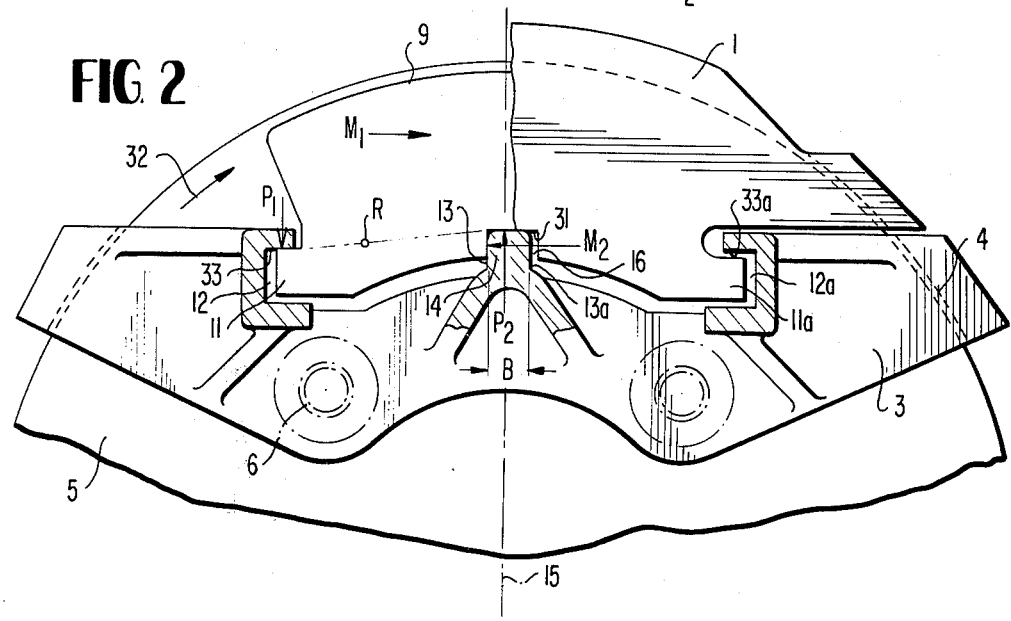
FIG. 2 is an elevational view in the axial direction of the brake disk, partly in cross section, of parts of the floating saddle, of the brake body, of the brake disk and of the brake lining.
Figure 3:
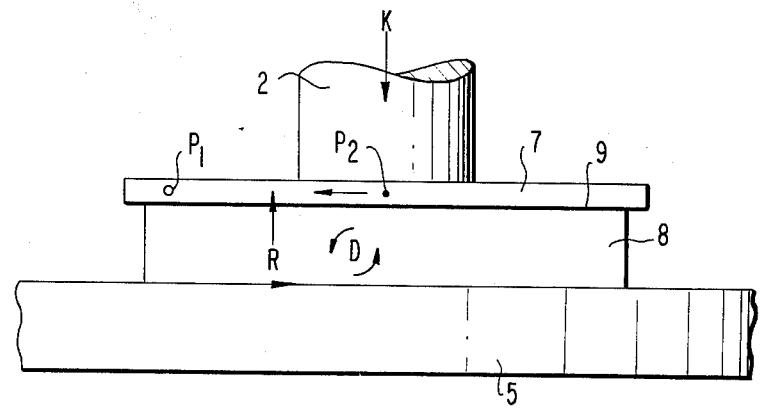
FIG. 3 is a schematic view indicating the cooperation of brake disk, brake cushion and piston according to the present invention.

During the actuation of the brake, the brake cushion 9 is pressed by the brake disk 5 rotating in the direction of the arrow 32 indicated in FIG. 2 against the nose 14 and the upper edge 33 of the recess 12 disposed on the inlet side of the brake disk 5. Two moments result thereby in the horizontal and in the vertical direction from the force pairs $M_1$, $M_2$ and $P_1$, $P_2$. The force $M_1$ is absorbed by the force $M_2$ by the later support surface 13 of the nose 14. The force $P_1$ which is exerted by the upper edge 33 of the recess 12, is opposite to the force $P_2$ acting on the roof surface of the nose 14, in order to absorb the corresponding counter-force from the brake cushion 9. As can be seen from FIG. 3, the friction force R resulting from the forces $P_1$, $P_2$ and $M_2$ according to the equation $R = (P_1 + P_2 + M_2) \cdot \mu$, where $\mu$ is the coefficient of friction between the material of the brake body and the brake cushion, is opposite to the force K exerted by the piston 2.

Since now the contact surface of the brake disk 5 and the support of the brake lining carrier 7 extend in planes which have a distance from one another that corresponds approximately to the thickness of the brake cushion, only a torque D still results which seeks to press the brake cushion 9 at the inlet side obliquely against the brake disk 5. This moment D is now compensated for or cancelled out by the friction force R resulting from the forces $P_1$, $P_2$ and $M_2$ so that the brake cushion 9 is forced evenly against the brake disk 5 and thus the brake lining 8 is worn uniformly or evenly.

Also during a reverse rotation of the brake disk 5, the same effect takes place; the projections 11a at the other side then only abut at the associated upper edge 33a of the recess 12a and the brake lining is additionally supported at the other support surface 13a of the nose 14.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A partial lining disk brake comprising:
   a brake disc means,
   brake body means including a first pair of spaced leg portions extending transversely of the axis of rotation of said brake disc means on respective sides thereof and a second pair of leg portions extending substantially parallel to the axis of rotation of said brake disc means and connecting the respective ends of said first pair of leg portions,
   side guide rails provided on said brake body means on each side of said brake disc means at an inlet and outlet side of said brake body means with respect to the direction of rotation of said brake disc means, said side guide rails opening toward each other and extending in the direction of the axis of rotation of the brake disc means,
   brake cushion means disposed on each side of said brake disc means, each of said brake cushion means including brake lining means and lining carrier means for supporting said brake lining means, said lining carrier means including an upper edge portion disposed at the periphery of the brake disc means, a lower edge portion disposed radially inwardly of said upper edge portion in the direction of the axis of rotation of said brake disc means, and lateral edge portions connecting the respective ends of said upper and lower edge portions,
   projection means provided on each lateral edge portion of each of said lining carrier means at the lower edge portion thereof, said projection means forming a minor portion of said lining carrier means, each of said projection means being disposed in a respective side guide rail so as to be axially displaceably guided therein,
   intermediate guide means provided on said brake body means at the lower edge portion of said lining carrier means, said intermediate guide means including guide surface means disposed at an axial center plane of the brake which extends vertially through the axis of rotation of the brake disc means, said guide surface means including first and second support surfaces disposed on respective sides of the axial center plane of the brake and spaced therefrom and a third support surface connecting the free ends of said first and second support surfaces,
   intermediate recess means provided on each of said lining carrier means along the lower edge thereof between said side projection means, said intermediate recess means including intermediate guide counter support surfaces which are engageable with said support surfaces of said intermediate guide means,
   a floating saddle means displaceably mounted on said brake body means, said floating saddle means including an upper edge portion disposed at the periphery of the brake disc means and a lower edge portion disposed radially inwardly of said upper edge portion in the direction of the axis of rotation of said brake disc means, and
   recess means provided in said floating saddle means at the lower edge thereof, said recess means including guide counter support surfaces engageable with said support surfaces of said intermediate guide means.

2. A partial lining disk brake according to claim 1, wherein said recess means and said intermediate guide means are arranged such that during actuation of the brake one projection means remains free from contact with a corresponding one of said side guide rails in such a manner that the brake lining means can be forced evenly against said brake disk means.

3. A partial lining disk brake according to claim 2, wherein said side guide rails are constructed of relatively great length.

4. A partial lining disk brake according to claim 3, wherein the ratio of width to length of said guide rails is about 1 : 10.

5. A partial lining disk brake according to claim 1, wherein said recess means are generally U-shaped in cross-section with the open end thereof facing the axis of rotation of the brake disk means.

6. A partial lining disk brake according to claim 5, wherein said recess means and said intermediate guide means are so arranged that during actuation of the brake one projection means remains free from contact with a corresponding one of said side guide rails.

7. A partial lining disk brake according to claim 1, wherein said side guide rails are constructed of a relatively great length.

8. A partial lining disk brake according to claim 7, wherein the ratio of width to length of said side guide rails is about 1 : 10.

* * * * *